No. 813,122. PATENTED FEB. 20, 1906.
M. TRAUTMANN.
FABRIC MOVING MECHANISM FOR EMBROIDERING MACHINES.
APPLICATION FILED NOV. 30, 1904.
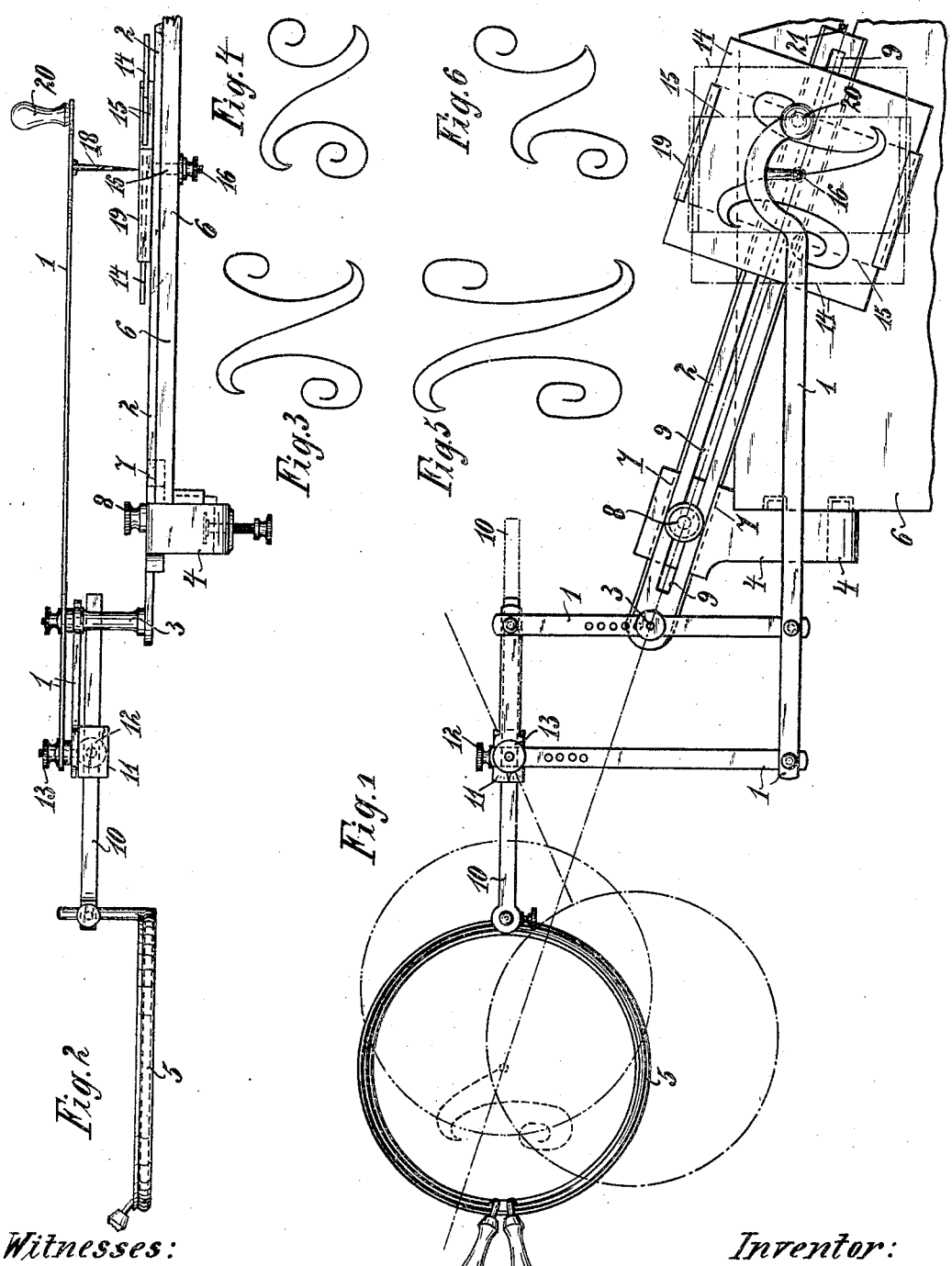
Witnesses:
Inventor:
Max Trautmann
by Eustace W. Hopkins
Attorney

UNITED STATES PATENT OFFICE.

MAX TRAUTMANN, OF DRESDEN, GERMANY.

FABRIC-MOVING MECHANISM FOR EMBROIDERING-MACHINES.

No. 813,122.     Specification of Letters Patent.     Patented Feb. 20, 1906.

Application filed November 30, 1904. Serial No. 234,944.

*To all whom it may concern:*

Be it known that I, MAX TRAUTMANN, a subject of the King of Saxony, and a resident of Dresden, Saxony, Germany, have invented new and useful Fabric-Moving Mechanism for Embroidering-Machines, of which the following is a full, clear, and exact description.

The present invention relates to the guiding mechanism for the embroidering-frame in connection with sewing-machines; and its object is to provide a guiding mechanism or pantograph by means of which the pattern to be copied may not only be copied on a larger or smaller scale, but may be varied in proportion—*i. e.*, it may be compressed, or flattened, or elongated, or stretched, as may be required. I attain this object by the mechanism illustrated in the accompanying drawings, in which—

Figure 1 is a plan, and Fig. 2 a side elevation, of the guiding mechanism. Figs. 3, 4, 5, and 6 are diagrams illustrating the various forms of reproduction of the pattern.

The device consists of the pantograph 1, having adjusting-holes 21 and 22 in two parallel bars, by means of which the pantograph may be adjusted on its pivot 3. The holes 22 enable the pantograph to be adjusted to a variety of proportions on its pivot 3, while the holes 21 enable the adjustment of the other bar for the same purpose. The latter is carried on a guide-bar 2, provided with a longitudinal slot 9, said bar being longitudinally guided in a guide 7, having an arm formed to a screw-clamp 4, Fig. 1, by means of which the whole is clamped to the table 6 or other support. The clamp 4 is advantageously clamped to a small wooden table 6, having its front edge straight, so that it will lie against the front edge of the sewing-machine table. This table is slotted at 21 to correspond with the guide-slot 9 of the bar 2. The said bar 2 may be slid in this guide and fixed in any desired position by means of the screw-nut 8. The guide 7 is arranged in a direction diagonal to the center line of the pantograph 1. The adjustment by means of the slot 9 and the nut 8 in the direction stated is provided with the object of retaining the pivot and the embroidering-needle in a line and with the guide-slot 2, thus facilitating the adjustment of the embroidering-frame. At the front end of the pantograph a sleeve 11 is pivotally supported which may be adjusted and clamped in position by means of a nut 13, and in this sleeve the embroidering-frame 5 is supported by means of its arm 10. By means of this mechanism and the clamping-screw 12 for the arm 10 the embroidering-frame 5 may be adjusted to the required position in the horizontal plane as regards the upper bar of the pantograph. By means of this arrangement it is rendered possible to vary the proportions of the copy as regards the original without changing the pivot of the pantograph. At the opposite end of the pantograph-frame a handle 20 is mounted, and on the lower side of the said bar the stylus 18 is arranged, with which the pattern or templet 14 is traversed. The pattern 14 is mounted between the overlapping flanges 19 of the holder-plate 20, which in its turn is pivoted to a supporting-plate 15, mounted to slide on the bar 2. This device has the effect that when the embroidering-frame guide is extended the pattern 14 will follow the movement, so that the stylus 18 will always remain in contact with the pattern-plate, while the latter may be adjusted to any desired position. The plate 14 is guided in the slot 9 by means of a pin 16, having a clamping-nut under the table 6, so that the said plate may be adjusted both around the said pin and in the slot.

The device operates in the following manner: When, as shown in the drawings, Figs. 1 and 2, the pivot of the parallelogram, as at 3, is exactly in the center of the right-hand parallel bar, the arm 10 is parallel with the lower arm of the pantograph and is so adjusted that the center of the frame 5 or the needle and the stylus 18 are equidistant from the pivot 3 the transfer is as one to one. Then the work or reproduction of the pattern 14 will be exactly the same size and configuration as the pattern, as shown at Fig. 3. If the arm 10, and with it the embroidering-frame 5, is pushed back in the sleeve 11 and the bar 2, together with the pivot 3, the pantograph and the pattern 14 pushed forward far enough to allow the center of the embroidering-frame to lie exactly under the embroidering-needle, as was previously the case, and the pattern is again copied, the reproduction on the embroidering-frame will have a compressed or flattened form, as illustrated in Fig. 4. If, again, the arm 10 is extended through the sleeve 11 and the parallelogram pushed back with its pivot 3 far enough to again bring the center of the embroidering-frame under the embroidering-needle of the machine, the reproduction will assume a long drawn-out form, as illustrated in Fig. 5. If, again, the pivot 3 is adjusted to another hole of the bar of the pantograph and the arm 10 turned on its pivot sufficiently far to again bring the needle to the center of the embroidering-frame, the reproduction will show a stretched shape, as illustrated in Fig. 6.

From the above description it will be seen that a great variety of reproduction may be made from one and the same pattern.

The fabric or material to be embroidered is clamped in the frame 5 by means of the usual clamping-ring. To assist in adjusting the device in the first place, a templet or plate having shoulders thereon may be slid into the parallelogram of the pantograph to retain the same rectangular for the time being.

I claim as my invention—

1. A guide device for the embroidering-frame for sewing-machines, consisting of a pantograph, a sleeve swiveled to its forward upper pivot, and having its rear lower arm extended, a stylus mounted on the extended end, an embroidering-frame having a stem to slide in said sleeve and means for fixing the said stem and sleeve in any desired position, a slotted slide-bar and means for guiding the same and adjusting it in any position, a pivot at the end of said bar to carry the said pantograph and a supporting-plate for the pattern, adjustable on said slide-bar beneath the stylus substantially as described.

2. A guide device for the embroidering-frame for sewing-machines, consisting of a pantograph, an embroidering-frame adjustably mounted at its forward end, an extended rear end and a stylus mounted therein, a sliding bar having a pivot at its end to engage one of a series of holes in the pantograph-arm, means for guiding the said bar and adjusting it to any desired position, a plate mounted on said bar to support the pattern beneath the stylus and means for adjusting said plate in the manner and for the purpose, substantially as described.

3. A guide device for the embroidering-frame for sewing-machines consisting of a pantograph having a sleeve swiveled to its forward upper pivot and means for arresting the said sleeve in any desired position, an embroidering-frame having a stem to slide in said sleeve and means for adjusting the said stem therein, a sliding bar having a pivot at its forward end adapted to engage in one of a series of holes in the pantograph, a slot in said guide-bar, a plate to support the pattern, said plate having a downwardly-extending pin to engage in the slot of said guide-bar and means for clamping the said pin to the said bar, a guide for said bar and means for clamping the bar in said guide in the manner and for the purpose substantially as described.

In testimony whereof I affix my signature in the presence of two witnesses.

MAX TRAUTMANN.

Witnesses:
 MORITZ SPREER,
 RUDOLPH FRICKE.